United States Patent
Serin et al.

(10) Patent No.: US 8,984,673 B2
(45) Date of Patent: Mar. 24, 2015

(54) PRESSURE EQUALIZING VALVE

(75) Inventors: Jean-Pierre Serin, Trementines (FR); David Dupe, La Tessoualle (FR); Nicolas Lecointe, Reze (FR)

(73) Assignee: Raccords et Plastiques Nicoll, Cholet (FR)

( * ) Notice: Subject to any disclaimer, the term of this patent is extended or adjusted under 35 U.S.C. 154(b) by 0 days.

(21) Appl. No.: 13/394,914

(22) PCT Filed: Sep. 7, 2010

(86) PCT No.: PCT/FR2010/051860
§ 371 (c)(1),
(2), (4) Date: May 1, 2012

(87) PCT Pub. No.: WO2011/030053
PCT Pub. Date: Mar. 17, 2011

(65) Prior Publication Data
US 2012/0204333 A1 Aug. 16, 2012

(30) Foreign Application Priority Data
Sep. 9, 2009 (FR) ..................... 09 56139

(51) Int. Cl.
*E03D 9/04* (2006.01)
*F16K 15/14* (2006.01)
*E03C 1/122* (2006.01)

(52) U.S. Cl.
CPC ............. *F16K 15/144* (2013.01); *E03C 1/1225* (2013.01)
USPC ............................................................ 4/211

(58) Field of Classification Search
CPC ........................................................ E03C 1/122
USPC ................................................. 4/209–209 FF
See application file for complete search history.

(56) References Cited

U.S. PATENT DOCUMENTS 3,628,565 A 12/1971 McWethy
3,815,629 A * 6/1974 Oberholtzer ............... 137/527.8

FOREIGN PATENT DOCUMENTS

| AU | 511 424 B2 | 8/1980 |
| DE | 34 14 077 A1 | 10/1985 |
| DE | 10 2007 012483 A1 | 9/2008 |
| DK | 3414077 A1 * | 10/1985 |
| DK | 102007012483 A1 * | 9/2008 |
| EP | 0 278 746 A2 | 8/1988 |
| NL | 8 200 799 A | 9/1983 |

* cited by examiner

*Primary Examiner* — Lori Baker
(74) *Attorney, Agent, or Firm* — 24IP Law Group; Timothy R DeWitt

(57) ABSTRACT

Equalizing valve (1) comprising a duct (6) having an inlet section (7) and an outlet section (8), a seat (10) and a valve element (12) able to move between a closed position and an open position, characterized in that said duct is able to admit a flow in which, for any flow line (13) between said inlet section and said outlet section, the velocity vector (15) at a given point makes an angle with the velocity vector (14) in the inlet section which increases with the distance away from the inlet section, the angle between the velocity vector (16) in the outlet section and the velocity vector in the inlet section ranging between 80° and 150°, and in which the valve element, in the closed position, makes an angle of between 0° and 70° with the normal to the outlet section.

7 Claims, 3 Drawing Sheets

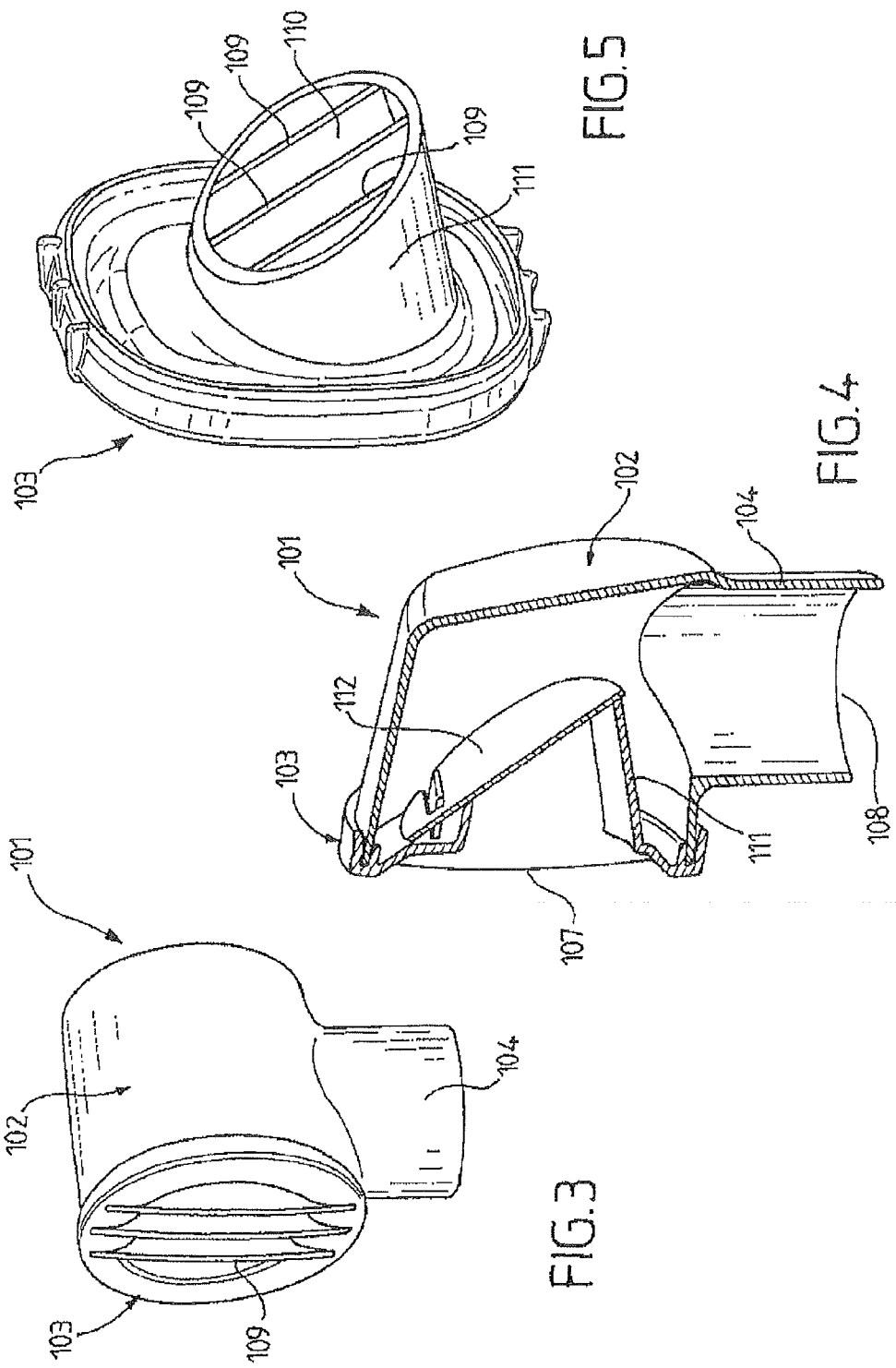

PRESSURE EQUALIZING VALVE

BACKGROUND OF THE INVENTION

The present invention concerns waste water drainage systems in buildings. More specifically, the present invention relates to an air pressure equalizing flap valve designed to be used in this type of system.

STATE OF THE ART

Waste water drainage systems typically include mainly horizontal drainage sections, called "manifolds" with a slight slope. These collect waste water from various fixtures channeling it to mainly vertical drainage sections, called "fall pipes". A fall pipe can accept several manifolds from one or more floors of a building such as a single or multi-family dwelling. These systems, in form of tree-shaped drainage systems made of tubular conduits, connect multiple sanitary fixtures and interact with each other according to known physical phenomenon during use.

The movement of effluents in the conduits produces pressure variations in the air within the conduits. This causes an influx of outside air (fresh air) when the internal pressure is less than atmospheric pressure and causes air to be expelled (waste or foul air) when the internal pressure is greater than atmospheric pressure.

Traditionally installed air traps on fixtures protect the room environment from emanations of foul air, and absorb some of the pressure fluctuations within the drainage system. However, they do not address all the issues, such as back flow, bubbling noises, or foul air release, and venting is therefore installed according to the rules of the art.

System venting is traditionally accomplished at the top of a fall pipe by an open end which opens above the roof of the buildings, and by means of a loop which connects critical points of the horizontal runs to atmospheric pressure.

When the system or part of the system is difficult to vent, and/or when it is not desirable to vent to the exterior of the building, an alternative solution is to fit certain critical points of the system with one-way pressure equalizing valves which allow air to enter the system when there is internal negative pressure, and prevent the release of foul air during internal positive pressure.

Standards define the suitability for use of one-way air pressure equalizing valves using the following operating criteria:
  Impact resistance
  Air tightness during internal positive pressure.
  Responsiveness: ease of opening with the slightest internal negative pressure.
  Air inlet capacity for extremely strong negative pressure.
  Durability
  Strength at temperature (above and below freezing)
  Method of installation
Other important criteria for these products which are not included in standards for suitability of use:
  Size, especially important for installation in tight spaces.
  Ability to operate in a vertical or horizontal position.
  Easy disassembly for maintenance.
  Not affected by condensation.
  Not affected by dust accumulation.

The document EP 0278746 describes a equalizing flap valve with an inclined closing element. In the event of internal negative pressure of the system, air enters the flap valve through an annular opening located below the closing element, and then the air rises to the closing element which is in the open position because of the negative pressure, and finally goes back down into the system through a circular tube.

In other words, the flow is first directed upwards, turns substantially 180°, and is then directed downwards. This path introduces resistance to flow which is detrimental to the responsiveness and the air inlet capacity of the one-way valve. In order to maintain acceptable values for these parameters, the required dimensions of the flap valve force a compromise on size.

Documents DE 34 14077 and U.S. Pat. No. 3,815,629 describe one-way valves that open under water pressure.

Document DE 10 2007 012483 relates to a diaphragm which remains fixed along its entire circumference.

SUMMARY OF THE INVENTION

A problem which the present invention proposes to resolve is that of providing a one-way air pressure equalizing valve which meets the various criteria mentioned above. In particular, one goal of the invention is to propose an equalizing flap valve to obtain an advantageous combination of air tightness, responsiveness, inlet capacity, and size by optimizing the air flux in the system.

The proposed solution of the invention is an air equalizing flap valve including a conduit with an inlet area and an outlet area, a seat located within said conduit, and a flapper that is movable between, on the one hand, a closed position in which it cooperates with said seat to prevent air flow from the outlet area towards the inlet area through said conduit and, on the other hand, an open position in which it allows air flow in the conduit from the inlet area towards the outlet area, the flapper being able to move from its closed position to its open position due to negative internal air pressure between the outlet area and the inlet area, said conduit being able to admit flow in which, for any path between the inlet area and the outlet area, the velocity vector at a given point forms an angle with the velocity vector in the inlet area which increases with the distance from the inlet area, the angle between the velocity vector in the outlet area and the velocity vector in the inlet area being between 80° and 150°, and in which the flapper, in the closed position, forms an angle between 0° and 70° with the normal of the outlet area, characterized in that the flapper has a thickness of between 0.4 mm and 6 mm.

Preferably, the thickness of the flapper is between 0.5 mm and 4 mm.

According to one embodiment, the flapper in the closed position forms an angle of between 30° and 70° with the normal of the outlet area. In this case, irrespective of whether the equalizing flap valve is positioned with its outlet area in the horizontal or vertical plane, the flapper will always be inclined.

Preferably, the flapper is movable by means of deformation or pivoting

According to one embodiment, the flapper is made of a flexible material. For example, the flapper is made of silicone, elastomer, TPE, rubber or other thermoplastic. In this case, the flapper can deform to move from its open position to its closed position. The choice of material and the thickness of the flapper affects the responsiveness of the one-way equalizing valve.

Preferably, the flapper has at least one notch. This will improve the flexibility and the responsiveness of the flapper.

Advantageously, the flap valve includes at least one lamella which runs across said inlet area and said seat.

According to another embodiment, the flapper is made of a rigid material. In this case, it could, for example, pivot on a pin to move from its open position to its closed position.

Advantageously, said inlet area has a square or rectangular shape with rounded corners. Such a shape allows a passage with a large cross-section while occupying less volume compared to a circular cross-section. Alternatively, the inlet area could be, for example, round or triangular.

Preferably, the flap valve has a body and a bonnet connected in an airtight and removable manner to the body; said conduit goes through said body.

According to one embodiment, said seat is attached to said bonnet. Alternatively, it is attached to the body.

The invention also proposes the use of the one-way air pressure equalizing valve with the outlet area oriented in the vertical or horizontal plane.

An object of the present invention is also the use of a equalizing flap valve, including a conduit with an inlet area and an outlet area, a seat arranged within said conduit and a flapper that is movable between, on the one hand, a closed position in which it cooperates with the seat to prevent airflow within said conduit from the outlet area towards the inlet area and, on the other hand, an open position in which it allows airflow within the conduit from the inlet area towards the outlet area, the flapper being able to move from its closed position to its open position due to the effect of negative pressure of internal air between the outlet area and the inlet area, said conduit being able to admit a flow for any path between said inlet area and said outlet area, the velocity vector at a given point forms an angle with the velocity vector in the inlet area which increases with the distance from the inlet area, the angle between the velocity vector in the outlet area and the velocity vector in the inlet area being between 80° and 150°, and in which the flapper in the closed position forms an angle between 0° and 70° normal to the outlet area, as an air pressure equalizer.

Preferably, the flapper is movable by deformation or pivoting.

BRIEF DESCRIPTION OF FIGURES

The invention will be better understood and other purposes, details, features and advantages thereof will be clearer with the following descriptions of several particular embodiments of the invention that are provided for as illustrations only and do not imply limitation. In the drawings:

FIG. 3 is a perspective view of an equalizing flap valve according to a second embodiment, FIG. 4 is a perspective cut-away view of the equalizing flap valve shown in FIG. 3, FIG. 5 is a perspective view of the bonnet of the equalizing flap valve shown in FIG. 3.

DETAILED DESCRIPTION OF ONE EMBODIMENT OF THE INVENTION

Figure 1:
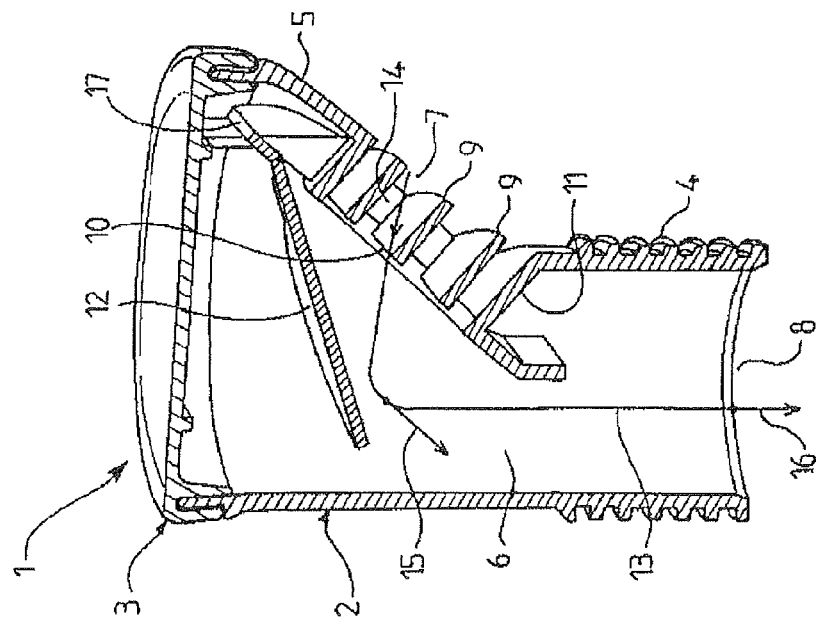
FIG. 1 is a perspective cut-away view of an equalizing flap valve according to a first embodiment.
Figure 2:
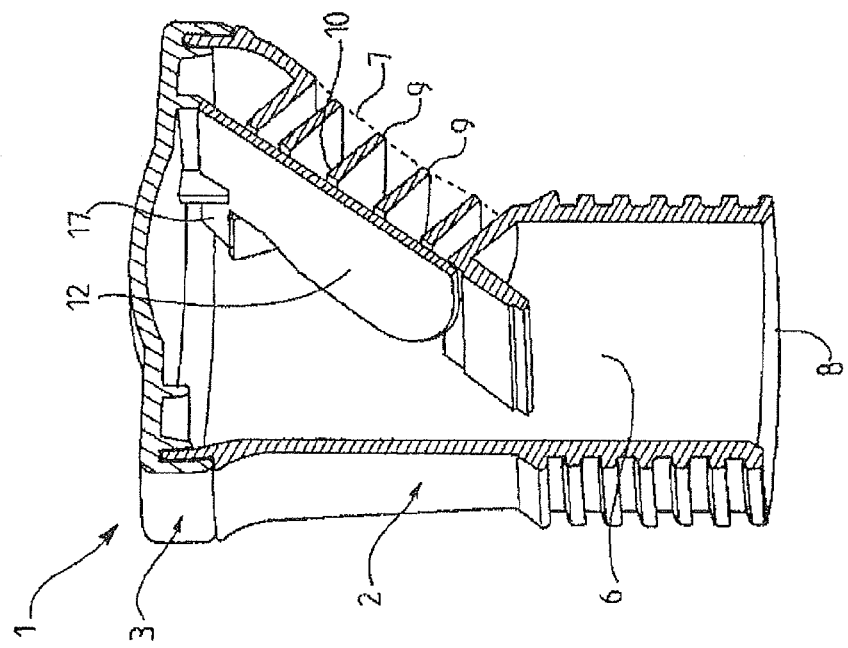
FIG. 2 is a perspective cut-away view of the equalizing flap valve shown in FIG. 1 with the flapper in the open position.

FIGS. 1 and 2 show a one-way air pressure equalizing valve 1, according to a first embodiment of the invention. The equalizing flap valve 1 includes a body 2 and a bonnet 3. The body 2 has a cylindrical portion 4 and a flared portion 5.

The cylindrical portion 4 has an open end. The end of the flared portion 5 is closed in an airtight manner by the bonnet 3, and the flared portion 5 has an opening on the side. In other words the equalizing flap valve delimits a conduit or passage 6 which extends from the inlet area 7, located on one side of the flared portion, at the outlet area 8 located at the end of the cylindrical portion 4.

In the example shown, the outlet area 8 has a circular shape and the inlet area 7 has a square or rectangular shape (not shown) with rounded corners. Alternatively, the inlet section could have, for example, a round or triangular shape.

The body 2 has a lip 11 which extends towards the inside from the inlet area 7. The parallel lamellas 9, arranged substantially perpendicular to the inlet area 7, span the opening delimited by the lip 11.

On the side opposite the inlet area, the lamellas 9 and the lip 11 form a seat 10. The equalizing flap valve 1 includes a flapper 12 which, in FIG. 1, rests on the seat 10. In the embodiment shown, the flapper 12 is shown as a flexible membrane. It is made of a flexible deformable material and is connected to the body 2 by a tab 17. For example, the flapper 12 is made of silicone, elastomer, TPE, rubber or other thermoplastic and has a thickness of 0.4 mm to 6 mm, preferably between 0.5 mm and 4 mm. Beyond these limits, the flap valve does not function as well, either because the flapper doesn't lift and remains on the seat in the closed position, or because it doesn't close completely against the seat and remains in the open position. The flapper 12 is therefore movable and can therefore deform to separate from the seat 10 as shown in FIG. 2.

In another embodiment, not shown, the flapper is represented in the form of a flap made of rigid material. The movable flapper is thus connected to the body in a pivoting manner.

It can be seen in FIG. 1 that when the flapper is resting on the seat 10, it is at an angle with respect to the normal of the outlet area 8. For example, the flapper forms an angle between 0° and 70°, preferably between 30° and 70°, with the normal of the outlet area 8.

The operation of the one-way air pressure equalizing valve is as follows.

The equalizing flap valve 1 is connected by its cylindrical portion 4 to a waste water drainage system.

In the event of internal positive pressure, that is to say when the air pressure on the inside of the drainage system is greater than atmospheric pressure, the flapper 12 lays in an airtight manner on the seat 10. The air tightness is also especially assured by the pressure differential exerted on the flapper 12.

In the event of internal negative pressure, when pressure on the inside the drainage system is less than atmospheric pressure, the movable flapper 12, in the form of a flexible membrane, deforms due to the force of the pressure differential, as shown in FIG. 2, and moves to an open position because of the vacuum pressure (suction) due to the negative internal air pressure between the outlet area and the inlet area of the equalizing flap valve 1. Thus, air coming from the outside penetrates the system by passing through the inlet area 7, the conduit 6 and the outlet area 8. In the alternate embodiment where a movable flapper is a rigid pivoting flap, it pivots into the open position.

The construction of the equalizing flap valve 1 offers several advantages because the inclination of the flapper 12, it is not necessary to overcome the total weight of the flapper 12 in order for it to move to the open position shown in FIG. 2. This contributes to excellent responsiveness in the equalizing flap valve 1. Additionally, it is possible to position the equalizing flap valve 1 with the outlet area 8 oriented in a substantially horizontal plane, as shown in FIGS. 1 and 2, or with the outlet area 8 oriented in a substantially vertical plane. In both cases, the flapper 12 is inclined.

With the flapper 12 inclined with respect to the seat 10, it tends to return to its position of rest shown in FIG. 1 in the absence of a negative pressure of air, which also contributes to the air tightness of the equalizing flap valve 1.

The configuration of the equalizing flap valve 1 allows conduit 6 to admit air flow with little change of direction. Thus, the equalizing flap valve has good air inlet capacity. More specifically, as shown by the flow path 13 in FIG. 2, it can be seen that the velocity vector 15 at a given point forms an angle with the velocity vector 14 which increases as a function of the distance from the inlet area. Therefore, there are not multiple changes in direction. Additionally, the angle between the velocity vector 16 in the outlet area 8 and the velocity vector 14 in the inlet area 7 is between 80° and 150°. The total directional change of the airflow is therefore limited. Of course, other constructions than that of conduit 6 shown can provide a flow with the aforementioned characteristics.

the shape of inlet area 7, square with rounded corners, provides a larger passage cross-section than a circular cross-section when the diameter equals the side of the square cross-section. This contributes to excellent air inlet capacity of the equalizing flap valve 1. A rectangular cross-section provides the same advantage.

Figure 6:
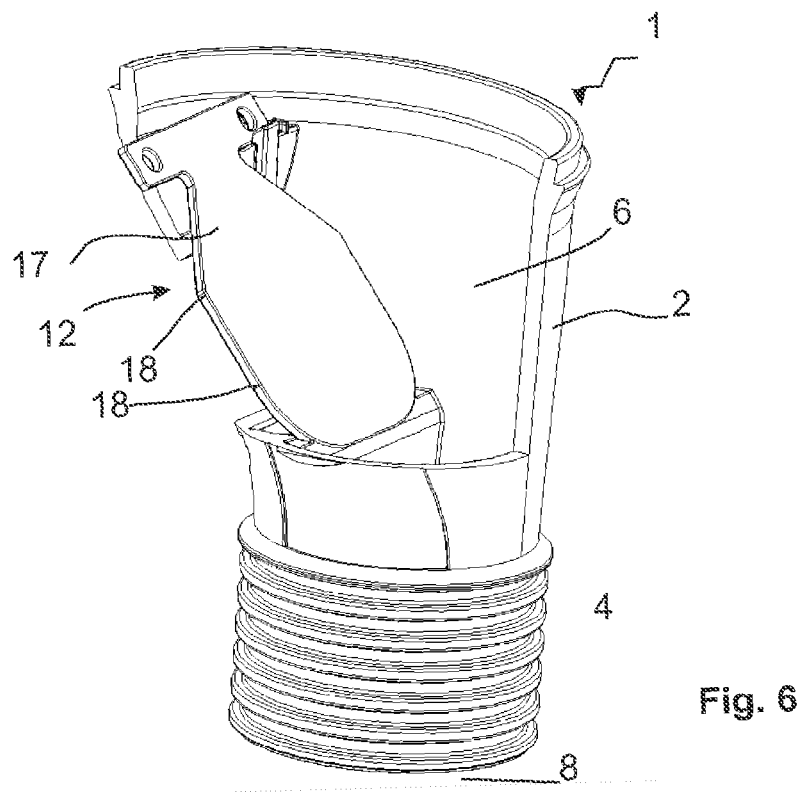
FIG. 6 is a cut-away view of an equalizing flap valve in an open position according to a third embodiment.
Figure 7:
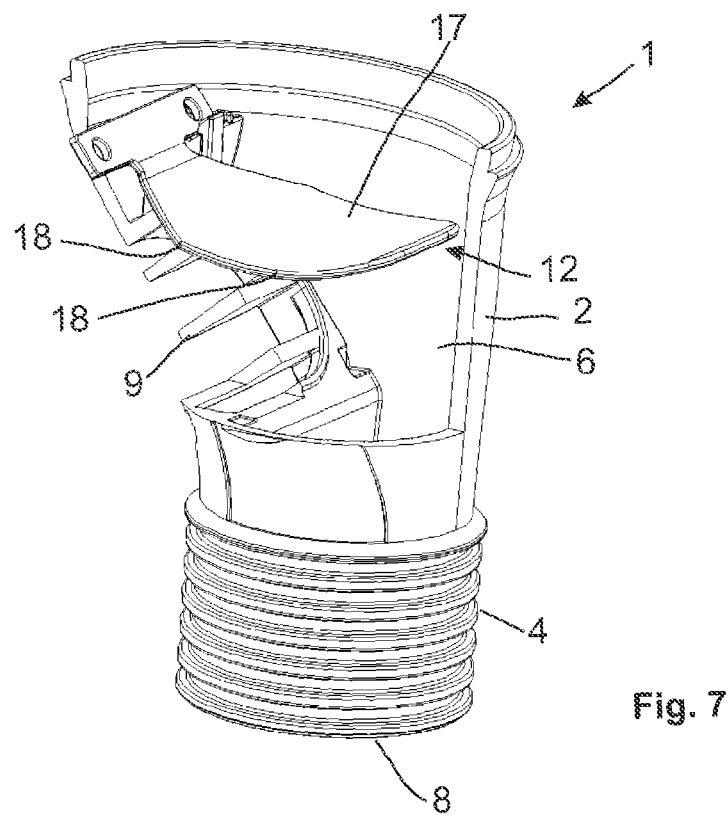
FIG. 7 is a cut-away view of the equalizing flap of FIG. 6, in a closed position.

In an embodiment that is shown in FIGS. 6 and 7, in which the flapper is made of a deformable material, the flapper 12 has notches 18 along the tab 17. The flapper 12 can then deform more easily, which contributes to the good reactivity of the flap valve 1. The elements in FIGS. 6 and 7 that are identical or similar to the elements of the first embodiment are designated with the same reference numbers.

The lamellas 9, angled toward the outside of the body 2, eliminate condensation that could adversely affect the proper operation of the equalizing flap valve 1 and that could interfere with proper venting of the waste water drainage system.

The bonnet 3 can be removed, allowing visual examination and cleaning of the inside of the equalizing flap valve 1.

FIGS. 3 through 5 show a equalizing flap valve 101 according to a second embodiment. The elements that are identical or similar to the elements of the first embodiment are designated with the same reference numbers increased by 100.

The equalizing flap valve 101 includes a body 102, and a bonnet 103. The body 102 can be connected to the system by its cylindrical portion 104.

The operation of the equalizing flap valve and its advantages are similar to those of the equalizing flap valve 1. The air can flow from the inlet area 107 to the outlet area 108 by deforming the flapper 112 which, when at rest, cooperates with the seat 110. The quite smooth flow and the angle of the flapper are mainly responsible for excellent reactivity and excellent air inlet capacity with reduced size.

The equalizing flap valve 101 has an additional advantage. In fact, as can be seen in FIG. 5, the lip 111, and the lamellas 109 (not shown in FIG. 4) are part of the bonnet 103 and can therefore be separated from the body 102, which facilitates inspection and maintenance of the air pressure equalizing flap valve 101.

Although the invention has been described in connection with several specific embodiments, it is quite evident that this is not limiting, and that the invention comprises all equivalent technical variations described as well as their combinations if they fall within the scope of the invention.

The invention claimed is:

1. An air pressure equalizing flap valve, including a conduit with an inlet area, and an outlet area, a seat located in said conduit and a flapper that is movable between, on the one hand, a closed position in which it cooperates with said seat to prevent air flow into said conduit from the outlet area towards the inlet area and, on the other hand, an open position which allows air flow into the conduit from the inlet area towards the outlet area, the flapper being able to move from its closed position to its open position due to the effect of negative internal air pressure between the outlet area and the inlet area, said conduit being able to admit flow in which, for any path between said inlet area and said outlet area, the velocity vector at a given point forms an angle with the velocity vector in the inlet area which increases with the distance from the inlet area, the angle between the velocity vector in the outlet area and the velocity vector in the inlet section being between 80° and 150°, and in which the flapper, in the closed position, forms an angle between 0° and 70° with the normal of the outlet area, characterized in that the flapper has a thickness between 0.4 mm and 6 mm, wherein the flapper is movable and the movement is achieved by deformation, wherein the flapper has at least one notch.

2. An air pressure equalizing flap valve according to claim 1, wherein the flapper, in the closed position, forms an angle between 30° and 70° with the normal of the outlet area.

3. An air pressure equalizing flap valve according to claim 1, wherein the flapper is made of flexible material.

4. An air pressure equalizing flap valve according to claim 1, wherein at least one lamella runs across said inlet area and said seat.

5. An air pressure equalizing flap valve according to claim 1, wherein said inlet area has a triangular, square or rectangular shape with rounded corners.

6. An air pressure equalizing flap valve according to claim 1, including a body and a bonnet connected in an tight and removable manner to the body, said conduit going through said body.

7. An air pressure equalizing flap valve according to claim 6, wherein said seat is attached to the bonnet.

* * * * *